United States Patent [19]

Gautheron

[11] Patent Number: 4,577,352
[45] Date of Patent: Mar. 25, 1986

[54] EXTRUDED SECTION FOR SWIMMING POOL ROLLABLE COVER

[76] Inventor: Lucien Gautheron, 1, rue Louis, 92160 Antony, France

[21] Appl. No.: 648,310

[22] Filed: Sep. 7, 1984

[30] Foreign Application Priority Data

Sep. 14, 1983 [FR] France ............................ 83 14614

[51] Int. Cl.⁴ .............................................. E04H 3/19
[52] U.S. Cl. .......................................... 4/499; 4/498; 160/225; 160/229 R
[58] Field of Search ................... 4/498, 502, 499, 500, 4/501, 503; 160/225, 229 R, 229 B, 232–234

[56] References Cited

U.S. PATENT DOCUMENTS 3,428,108 2/1969 Singer ............................ 160/229 R
3,613,126 10/1971 Granderath ........................ 4/172.14
4,450,883 5/1984 Fischer ............................ 160/229 R

FOREIGN PATENT DOCUMENTS 2756738 7/1978 Fed. Rep. of Germany .
2491980 4/1982 France .
0634379 1/1983 Switzerland .................... 160/229 R
1025946 4/1966 United Kingdom .

Primary Examiner—John E. Kittle
Assistant Examiner—James J. Seidleck
Attorney, Agent, or Firm—Dennison, Meserole, Pollack & Scheiner

[57] ABSTRACT

The extruded section, defining hollow compartments comprises two complementary assembly shapes permitting a limited articulation of two assembled sections, and comprises at each of its ends, a plug for closing off the compartments; this end plug cooperates with the assembly shapes to lock the assembly in the longitudinal direction without impairing the articulation, and to lock the articulation in the transverse direction. The end compartments of the sections are equipped with waterproof plugs in closed cell foam of synthetic material.

8 Claims, 1 Drawing Figure

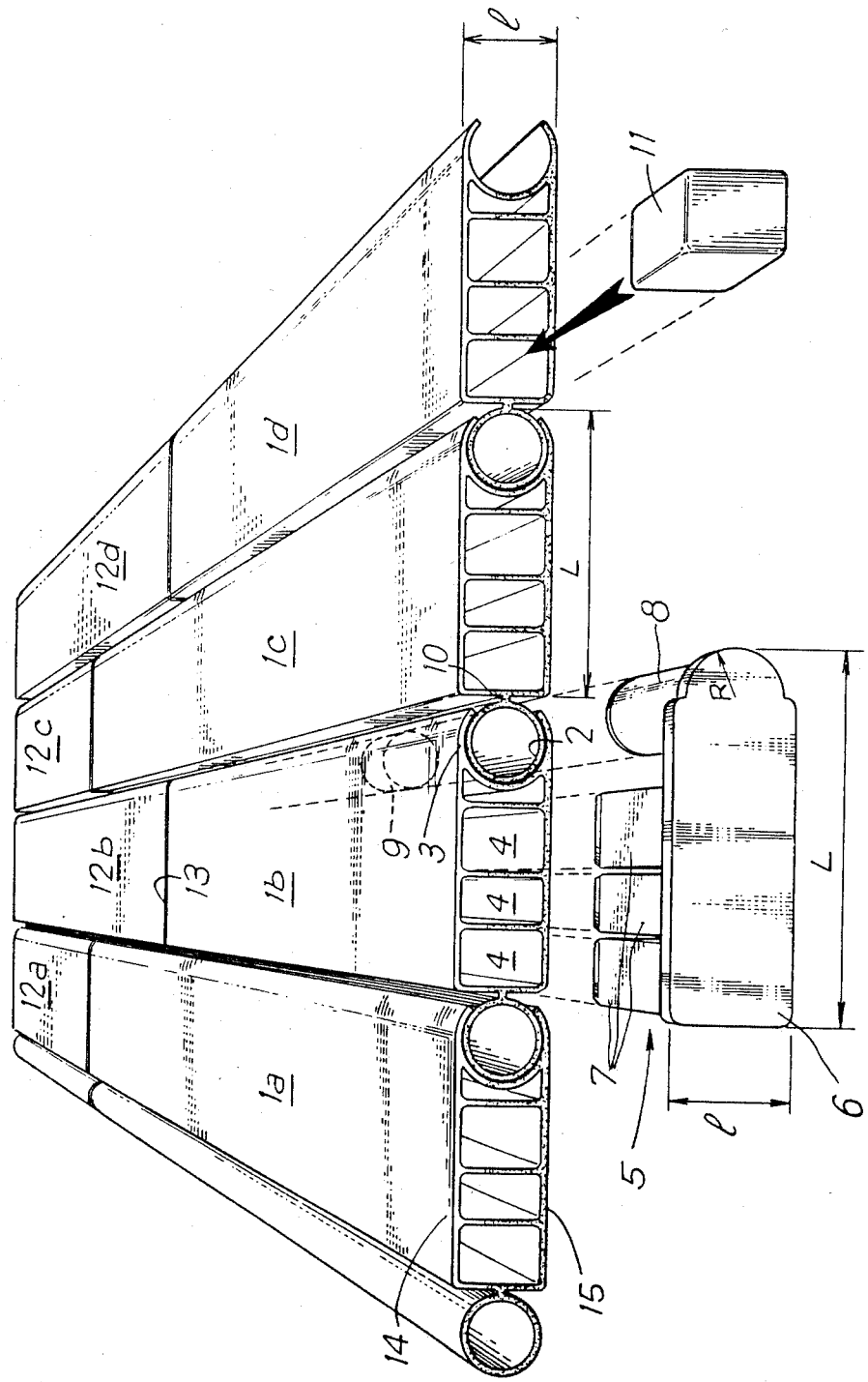

EXTRUDED SECTION FOR SWIMMING POOL ROLLABLE COVER

BACKGROUND OF THE INVENTION

The invention relates to a section for swimming pool rollable cover, said section being of the type with open compartments comprising, longitudinally, two complementary assembly shapes permitting a limited articulation of two assembled sections, each shape being equipped at each end with a plug for tightly closing the compartments.

It is known that swimming pool covers are particularly used to limit pollution, to save on the heating of the water and to prevent risks of accidents. Amongst the existing types of covers, automatic rollable covers offer the best guarantees: they are composed of a rolling shutter made up of plastic strips which slide over the surface of the water and are combined to a hand- or electric-operated winding device.

In order to be more efficient, the covers must keep a minimum clearance between the walls of the pool and the sides of the shutter therefore it is imperative for the strips to be fixed one to the other in such a way that it is impossible for them to shift sideways, which could cause jamming of the cover during operation. In the currently known covers, the strips are interconnected in the longitudinal direction by a complex fastening of the connecting shapes which is not altogether satisfactory because of its complexity, of the risks of breaks, and because the connecting shapes as well as the fastening method allow the pool water to filter through to the top of the cover, as the tightness problems existing with an articulated assembly and with fastening means preserving the articulation, are yet to be solved.

It is the object of the present invention to overcome the disadvantages of the known systems and to propose a section which guarantees a straightness of edges to the cover without the possibility of one section moving sideways with respect to the others and which also achieves perfect tightness.

This object is reached due to the presence of end plugs provided for sealing off the end of the sections and to give them a new function: indeed, according to the invention, the end plugs cooperate with the connecting shapes in order to lock the assembly in the longitudinal direction without impairing the articulation.

To this effect, the plug according to the invention generally comprises a part which is used for closing off the compartments inside the section, and a part which projects towards the connecting shape of the section and acts as a longitudinal bearing for the complementary connecting shape of the next section. The presence of a plug at each end of a section thus ensures the longitudinal immobilizing of the next section.

It is found however that sections produced by extrusion are in general far from having the strict dimensions of end openings that they should have, and that, as a result, perfect tightness cannot always be guaranteed with the aforedescribed plug means, which is itself molded with very precise tolerances, and may not adapt to the openings of the section compartments.

For this reason, it has been decided to provide an extra plug for tightness. The plugs known heretofore, such as in cork, are not satisfactory because they are difficult to fit in and they are not completely hermetical when the section is not round; moreover, they deteriorate after a while in contact with pool water. They also impose having a large stock of various sizes and shapes to suit all types of sections.

According to the invention, waterproofing plugs, in closed-cell foam of synthetic material, of dimensions greater than the dimensions of the sections to be sealed off, are adhesively fixed in the openings. Due to the resiliency of such a material (of the type: neoprene foam, or nitril foam, or foams of other cellular rubbers, known under the designations EPDM, EPT, SBR, etc.), which is forced into the cavity, the plug is in full resting contact against the walls of the section to be sealed off.

For ready introduction of said plug into the cavity, the invention proposes to use an adhesive which is very fluid (oil-like) before drying, into which the plug is dipped before being inserted, said adhesive acting then as a lubricant. An acrylo-nitril adhesive (containing an acrylic substance in fluid solution compatible with the neoprene and any other rubbers used) has been found to be very suitable.

According to another aspect of the invention, said plug can be replaced by or accompanied with a plug of hard-setting foam which is introduced into the cavity in the soft state and left to harden therein.

In an advantageous embodiment the connecting shapes are of circular cross-section for the male shape, and of cross-section in arc of circle for the female shape, the male shape being hollow at least at its ends to receive a complementary cylindrical projection formed on the plug of the next section and comprising means of longitudinally immobilizing the female shape.

Indeed, according to this particular assembling design, the cover is virtually waterproof in the connecting points and play is insignificant widthwise of the strips, which permits a fine and easy end-of-course adjustment of the operating device. In addition, the cylindral projection locks the assembly in position in the width of the strips, which is another object of the invention.

The section according to the invention is obtained by extrusion. The male cylindrical connecting shape is then entirely hollow. To use it as a flat and to improve waterproofness of the cover, it should also be tightly closed off, and it is provided to this effect with two inner plugs formed in the vicinity of its ends.

Advantageously, the end plugs are constituted by a base-plate provided with one or more projections for hermetically closing the compartments, and, on the side of the female connecting shape, it comprises a cylindrical projection designed to be received by the male connecting shape of the next section. The projections used for closing off the compartments are adhesively fixed thereto.

In order to take advantage of the hot-house effect, the upper face of the section is translucid or transparent. But to prevent algae from spreading into the pool water, the lower face of the section is opaque, in actual fact, it is black, in order to help the absorption of the solar radiations. This bicolorism is obtained in the mass, during extrusion, in preference to the use of a black paint which would badly withstand the chemical agressions of the pool water and of its various additives.

BRIEF DESCRIPTION OF THE DRAWING

The invention will be more readily understood on reading the following description, reference being made to the accompanying drawing which shows a perspective view of the extruded sections assembled according to the invention, with, in the foreground, an end plug before insertions.

DETAILED DESCRIPTION OF A PREFERRED EMBODIMENT

According to said FIGURE, four sections 1a, 1b, 1c, 1d joined one to the other by a male shape 2 of circular cross-section linked by a web 10 to the compartments of the section, and a female shape 3 of cross-section in arc of circle whose more or less wide opening defines the pivoting limits of two adjacent sections. Each section is of the type with open compartments 4.

As illustrated in the FIGURE, the sections are bicolored: their upper face 14 is translucid or even transparent, whereas their lower face 15 is black.

The end plugs 5 ( of which only one is shown in the FIGURE for clarity, before its insertion into section 1b) are constituted by a base-plate 6 of substantially rectangular general shape, but for one exception to be described in detail hereinafter. Its width l is equal to the thickness of a section 1 and its length L is equal to the average width of a section when assembled (namely width of the compartments + one connecting shape).

The base plate 6 is provided with projections 7 for the hermetic plugging of the compartments 4 of section 1, and with a cylindrical projection 8 on the side of the female connecting shape 3 of the sectional member 1b (see righthand side of the FIGURE).

Said cylindrical projection 8 is designed to be received by male connecting shape 2 of the next section 1c, said shape 2 being to this effect, hollow and of inner diameter substantially equal to the outer diameter of the cylindrical projection 8.

When plug 5 is inserted in section 1b and in shape 2 of the next section 1c, the base plate 6 acts as a stop means for the shape 2 which is thus immobilized longitudinally in one direction. An identical plug being placed at the other end of the section 1b, shape 2, and as a result shape 1c are completely immobilized longitudinally with respect to section 1b, without the articulation of sections 1b and 1c being affected, since projection 8 can pivot freely in shape 2.

To allow this free pivoting movement of projection 8 inside shape 2, said projection is not adhesively fixed in said shape 2, contrary to projections 7 which are adhesively fitted in compartments 4 in order to secure plug 5 in position and to ensure waterproofness of the compartments.

To take full advantage of the hollow shape 2 and thus increase the floating ability of the cover, water should not be allowed to filter into said shape 2 through the slight play which exists between projections 8 and shape 2. To this effect, provisions are made to place two internal cylindrical plugs 9, for example in cork or in closed cell foam, inside said shape 2 and around its two ends, although short of the zone which receives the cylindrical projections 8.

Base plate 6, which, as already indicated, is of rectangular general shape, is, on the cylindrical projection 8 side, rounded to form a semi-circle centered on the axis of projection 8, and whose radius R is not more than the outer radius of section 2, thus ensuring that base-plate 6 of plug 5 of section 1b does not come into contact with the base-plate of the plug of the next section 1c when the two members form an angle between them.

An added advantage of the plug equipped with the cylindrical projection 8 according to the invention is that besides immobilizing the sections longitudinally, it also immobilizes them transversely: indeed, cylindrical projection 8 prevents any sudden disconnecting of connecting shapes 2 and 3 caused for example by heavy loads on the cover. The plug according to the invention thus increases the safety of the cover. And this is found particularly useful when fitting the cover, if said cover is exposed to heat and should become overheated: the plastic which constitutes the connecting shapes softens and, without the projection which locks the articulation in the width of the slats, said slats would risk to come apart.

To make the compartments completely waterproof (for simplification of the description, the inside of the hollow male shape 2 will be considered as a compartment), a plug 11 is introduced in every compartment before insertion of plug 5, said plug 11 being given more or less roughly the shape of the cross-section to be plugged, and having larger dimensions. Plug 11 is produced from a foam with closed and elastic cells which is pressed into the compartment. According to one special feature of the invention, a very fluid adhesive is used for fixing the plug inside said compartment, said adhesive acting as "lubricant" when the plug is being introduced into the compartment and making positioning thereof easier.

In the FIGURE, only one plug 11 of substantially cubic or parallelepipedal shape is shown, before its insertion into a compartment, and only one plug 9 fitted inside a cylindrical compartment.

Obviously, it is possible, given the resiliency of foam rubber, to use the same plugs for compartments of slightly different dimensions.

Plugs 11, 9 are designed to be placed close to the free edge of a section.

Due to the possibility afforded by the invention of achieving complete tightness, it is now possible to optimize the lengths of sections in order to produce a swimming-pool cover.

Indeed, up to now, it was necessary to use continuous sections to cover the width of a swimming-pool, this implying either an extrusion-to-measure, or the necessity to stock up sections of adequate length to meet all possible requirements.

Due to the possibility of hermetically plugging the sections, it is possible according to the invention to use two or more sections 1 and 12, end-to-end, to cover the length of the pool. Said sections are plugged with plugs according to the invention close to their adjacent ends 13. Sections 12 and 1 are of different length. It is possible to use only two different lengths, taking care to change the order of assembly from one line of sections to another so that the discontinuities between the sections are not aligned in every row. Thus, by staggering the arrangement of the sections, stability of the assembly is ensured by the connecting shapes.

In this way, instead of having to stock up sections of different dimensions with much waste at cutting, it is sufficient to stock elements of 2 or 3 meters, any cuts being re-usable and joined end-to-end in tight manner.

The invention further permits, in cases of repair, to only have to change the faulty part.

As indicated hereinabove, plug 11 can be replaced or duplicated by a lump of hard-setting synthetic foam, which is inserted when still in the soft state.

Besides dehydrating gel is advantageously placed inside the compartments before plugging to combat any excess of relative humidity.

What I claim is:

1. In a swimming pool cover consisting of a plurality of longitudinally extending compartmented, interconnected and articulated sections, the combination comprising:

at least two sections, each including upper and lower major faces interconnected by longitudinal side walls and further including at least one longitudinally extending compartment defining openings at each end of said section;

connecting means extending outwardly along each side wall, each of complementary configuration with respect to the connecting means on an adjacent section and configured to permit articulation of each section within a predetermined range with respect to the next section of said plurality of interconnected sections when interconnected;

one of said connecting means on each section being of substantially hollow circular cross-section open at each end and defining a male element, the other of said connecting means on each section being of discontinuous arcuate cross-section and defining a female receptacle dimensioned to partially encircle said male element when said male and female connecting means are interconnected, and an end plug for each end of each section, said plug having a base plate, and including means defining a projection mounted thereon configured to enter and seal the open circular end of said male connecting means on the adjacent section and preclude relative longitudinal displacement of a pair of interconnected male and female elements while permitting relative articulation within said predetermined range, said end plug further including at least one additional projection configured to enter and seal the open end of said compartment.

2. A section as claimed in claim 1, wherein the male connecting shape is entirely hollow and is equipped with two internal waterproof plugs close to its ends, and before the area where the cylindrical projections are received.

3. A section as claimed in claim 1, wherein means are provided for locking the articulation in the direction of the width of the sections.

4. A section as claimed in claim 3, wherein the means for locking the articulation are constituted by a cylindrical projection formed on the end plug and cooperating with a complementary hollow formed in one of the two connecting shapes.

5. A section as claimed in claim 1, wherein the upper face is translucent or transparent, and the lower face is blackened through.

6. A section as claimed in claim 1, wherein compartments are provided at its ends, said compartments being equipped with a waterproof plug in the form of a closed-cell synthetic material.

7. A section as claimed in claim 6, wherein the waterproof plug is produced from hand-setting foam introduced into the compartment whilst in the soft state.

8. A section as claimed in claim 7, wherein said waterproof plug is a resilient lump precut to dimensions greater than those of the compartment, and secured therein by adhesive means.

* * * * *